July 21, 1931.  F. W. LEE  1,815,516

ELECTRICAL TRANSLATING APPARATUS

Filed Nov. 26, 1929

INVENTOR
F. W. Lee
by [signature]
his attorney.

Patented July 21, 1931

1,815,516

UNITED STATES PATENT OFFICE

FREDERICK W. LEE, OF WASHINGTON, DISTRICT OF COLUMBIA, ASSIGNOR TO THE UNION SWITCH & SIGNAL COMPANY, OF SWISSVALE, PENNSYLVANIA, A CORPORATION OF PENNSYLVANIA

ELECTRICAL TRANSLATING APPARATUS

Application filed November 26, 1929. Serial No. 409,828.

My invention relates to electrical translating apparatus, and particularly to apparatus of the type comprising an input circuit which is at times supplied with current, and an output circuit in which the flow of current is controlled in accordance with the current supplied to the input circuit.

The present application is a continuation in part of my co-pending application Serial No. 145,265, filed October 30, 1926, for electrical translating apparatus.

I will describe two forms of translating apparatus embodying my invention, and will then point out the novel features thereof in claims.

Figure 1:
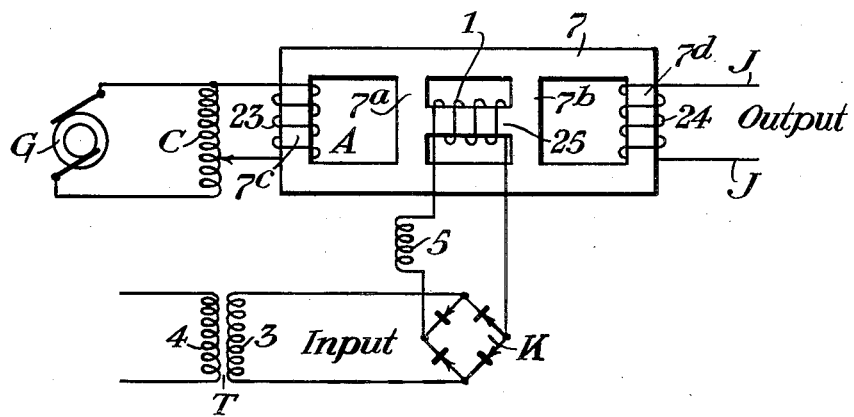
Figure 2:
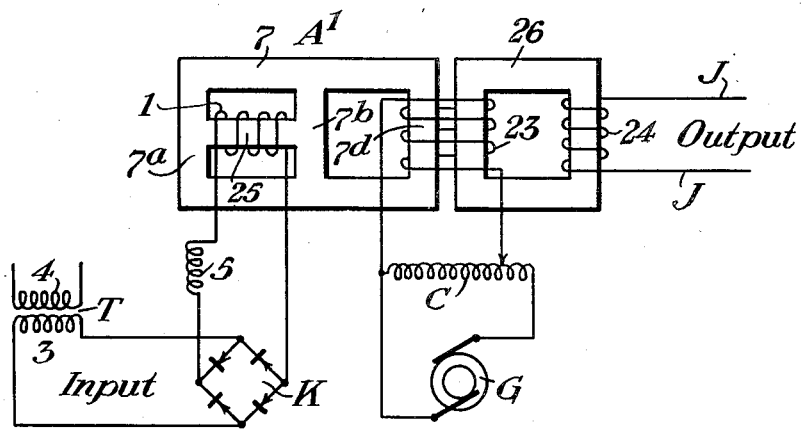

In the accompanying drawings, Fig. 1 is a diagrammatic view illustrating one form of translating apparatus embodying my invention. Fig. 2 is a view similar to Fig. 1 showing a modified form of translating apparatus also embodying my invention.

Referring first to Fig. 1, the reference character A designates a transformer having a ladder shaped magnetizable core 7 provided with two inner cross bars 7ª and 7ᵇ and two outer cross bars 7ᶜ and 7ᵈ. The outer cross bar 7ᶜ is provided with a primary winding 23, and alternating current is supplied to this winding from a source which is here shown as an auto transformer C having its primary terminals connected directly with an alternator G.

The outer cross bar 7ᵈ carries a secondary or output winding 24 which is connected with the conductors J of an output circuit. The output circuit may supply current to an electro-responsive device of any suitable type or may feed into the input circuit of a second stage of translating apparatus similar to that here shown.

The transformer A is also provided with an input winding 1 which is located on a portion of the core 7 which is not linked by alternating flux created by current in the primary winding 23. In the form shown in Fig. 1 a magnetizable bridging member 25 connects the mid points of the two inner cross bars 7ª and 7ᵇ and winding 1 is located on this bridging member. It will be plain that the magnetic potentials of the two ends of the bridging member 25 are normally the same so that no flux traverses winding 1 due to the alternating flux created in core 7 by current in winding 23. The input winding 1 is at times supplied with current from an input circuit which may in turn be supplied with energy in any suitable manner. As here shown, alternating current is supplied to the input circuit from the secondary 3 of a transformer T, the primary 4 of which is supplied with alternating current from a suitable source not shown in the drawings. A rectifier K of any suitable type is interposed between the input circuit and the winding 1 so that unidirectional current is supplied to the winding. An impedance 5 is interposed between the rectifier K and the winding 1 to limit the alternating component of the current supplied to this winding from the rectifier.

The alternating magnetic flux created in core 7 by the alternating current in winding 23 flows through three parallel magnetic paths, namely, paths comprising the cross bars 7ª, 7ᵇ and 7ᵈ, respectively. The parts are so proportioned that for small values of input current a comparatively large proportion of the alternating current flux supplied by winding 23 flows through the cross bars 7ª and 7ᵇ. Under these conditions, the electromotive force induced in winding 24 is comparatively small and the output current delivered to conductors J is correspondingly small. When the input current is increased, however, the increased magnitude of the unidirectional flux created in the cross bars 7ª and 7ᵇ increases the effective reluctance of these bars to the alternating flux supplied by winding 23 and an increased proportion of the alternating flux links winding 24 and induces in that winding a correspondingly large voltage. It follows that for small values of input energy, the output current is small, but that for large values of input energy, the increased magnetic coupling between windings 23 and 24 produces a larger output current. The total variation in the output current may be many times the variation in the input energy, the actual value of the output energy being dependent upon the design and proportions of the various parts.

In the modified form of apparatus shown in Fig. 2, the transformer A comprises two magnetizable cores 7 and 26. The core 7 has three cross bars 7ª, 7ᵇ and 7ᵈ, and the primary winding 23 surrounds cross bar 7ᵈ of core 7 and also surrounds one leg of the core 26. The secondary or output winding 24 is located on core 26 and the input winding 1 is located on the bridging member 25 connected with the mid points of cross bars 7ª and 7ᵇ of core 7. The operation of the apparatus shown in Fig. 2 is analogous to the operation of the apparatus previously described in connection with Fig. 1, and will be understood without further explanation. It should be pointed out particularly, however, that with the apparatus shown in Fig. 2, since the secondary winding 24 is coupled closely with the primary winding 23, the efficiency of the apparatus is comparatively high. Another advantage of the structure shown in Fig. 2 is that no portion of the flux path linking the primary and secondary windings is traversed by the flux created by input energy. Both forms of the apparatus shown in Figs. 1 and 2 are arranged to prevent the supply of abnormally high output currents in case of any short circuit or open circuit of any of the windings.

One advantage possessed by both forms of the apparatus shown is that since the flux from winding 23 does not link winding 1, there is no "feed back" into the input winding from the transformer A. That is to say, the alternating flux created in transformer A by current in the primary 23 does not induce energy in winding 1 and hence can not create undesirable currents in the input circuits.

Apparatus embodying my invention is particularly suitable for, though in no way limited to, use in automatic train control systems of the continuous inductive type. In systems of this character, the secondary 3 of the transformer T which supplies the input circuit would ordinarily be carried on the train, and the track rails would ordinarily constitute the primary 4 of this transformer. The output circuit J may supply current to an electro-responsive device of any suitable type which may in turn control governing means on the train.

Although I have herein shown and described only two forms of electrical translating apparatus embodying my invention, it is understood that various changes and modifications may be made therein within the scope of the appended claims without departing from the spirit and scope of my invention.

Having thus described my invention, what I claim is:

1. In combination a ladder shaped magnetizable core having two outer cross bars and two inner cross bars, a first winding on one outer cross bar supplied with alternating current, a second winding on the other outer cross bar for supply current to an output circuit, a bridging member connecting the mid points of said inner bars, and a third winding on said bridging member at times supplied with unidirectional current.

2. In combination, a ladder shaped magnetizable core having two outer cross bars and two inner cross bars, a first winding on one outer cross bar supplied with alternating current, a second winding on the other outer cross bar for supplying current to an output circuit, a bridging member extending from a point on one said inner bar to a point on the other said inner bar having the same instantaneous magnetic potential with respect to flux from said first winding, a third winding on said bridging member, and means for at times supplying current to said third winding to vary the electromotive force applied to said output circuit.

3. In combination, a magnetizable core, three windings located on different parts of said core, means for supplying one said winding with alternating current to create in said core an alternating magnetic flux which links a second one of said windings but does not link the third said winding, and means for at times supplying current to said third winding independently to produce in said core an auxiliary flux which does not link said first or second windings but which varies the flux from said first winding which links said second winding.

4. In combination, a magnetizable core, a primary winding and a control winding located on different parts of said core, a third winding inductively related with said primary winding, means for supplying said primary winding with alternating current to create in said core an alternating magnetic flux which does not link said control winding, and means for at times supplying current to said control winding independently to produce in said core an auxiliary flux which does not link said primary winding or said third winding but which varies the flux from said primary winding which links said third winding.

5. In combination, a transformer comprising a magnetizable core, a primary winding on said core, means for supplying alternating current to said first winding, a second winding inductively related with said primary winding for supplying current to an output circuit, a bridging member connecting two points on said core having the same magnetic potential with respect to flux from said primary winding, a third winding on said bridging member, and means for at times supplying current to said third winding to create a control flux in said core which varies the reluctance of said core to flux from said first winding but which control flux does not link said second winding.

6. In combination, a transformer comprising a magnetizable core, a primary winding on said core, means for supplying alternating current to said first winding, a bridging member connecting two points on said core having the same magnetic potential with respect to flux from said primary winding, a second winding on said bridging member, means for at times supplying current to said bridging member to vary the reluctance of said core to flux created by current in said primary winding, and a third winding supplying current to a load circuit and inductively related with said primary winding but not linked by flux created by current in said second winding.

7. In combination, two magnetizable cores, a first winding wound on both cores, a second winding on one core, a bridging member of magnetizable material connecting two points of the other core which are subjected to the same instantaneous magnetic potential as a result of flux from said first winding, a third winding on said bridging member, and means for at times supplying current independently to said third winding.

In testimony whereof I affix my signature.

FREDERICK W. LEE.